United States Patent
Huang

(10) Patent No.: US 8,254,043 B2
(45) Date of Patent: Aug. 28, 2012

(54) BARREL AND LENS MODULE WITH SAME

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 119 days.

(21) Appl. No.: 12/889,416

(22) Filed: Sep. 24, 2010

(65) Prior Publication Data

US 2012/0008219 A1   Jan. 12, 2012

(30) Foreign Application Priority Data

Jul. 12, 2010   (TW) .............................. 99122838 A

(51) Int. Cl.
*G02B 7/02* (2006.01)
*G02B 15/14* (2006.01)
(52) U.S. Cl. ......... 359/819; 359/822; 359/700; 359/704
(58) Field of Classification Search .......... 359/694–704, 359/811–824, 829
See application file for complete search history.

(56) References Cited

U.S. PATENT DOCUMENTS

| | | | |
|---|---|---|---|
| 7,515,366 B2 * | 4/2009 | Chang | 359/824 |
| 7,680,408 B2 * | 3/2010 | Chang | 396/133 |
| 7,869,146 B2 * | 1/2011 | Noh et al. | 359/811 |
| 7,929,226 B2 * | 4/2011 | Yen | 359/819 |

* cited by examiner

*Primary Examiner* — Mohammed Hasan
(74) *Attorney, Agent, or Firm* — Altis Law Group, Inc.

(57) ABSTRACT

A barrel includes a supporting part at one end of the barrel adjacent to an image side, and a plurality of protrusions formed on an inner surface of the barrel. Each protrusion includes a guiding surface and an engaging surface connected with the guiding surface. Each guiding surface is oblique relative to a central axis of the barrel. A distance between the central axis and a portion of the guiding surface adjacent to the image side is larger than that between the central axis and another portion of the guiding surface next to an object side. The engaging surface and the supporting part cooperatively clamp optical components in the barrel.

18 Claims, 3 Drawing Sheets

BARREL AND LENS MODULE WITH SAME

BACKGROUND

1. Technical Field

The present disclosure relates to a barrel and a lens module having the barrel.

2. Description of Related Art

Lens modules are widely used in various portable electronic devices, such as, cell phones.

In assembly of a typical lens module, lenses are fastened in a barrel of the lens module by applying adhesive to a lens, which is assembled last into the barrel. However, if too much adhesive is applied, it may cross-contaminate the interposing spaces between adjacent lenses. Accordingly, a distance between the two lenses may be larger than desired, thus reducing image quality of the lens module.

Therefore, it is desirable to provide a new barrel and a new lens module, which can overcome the above-mentioned limitations.

DETAILED DESCRIPTION

Figure 1:
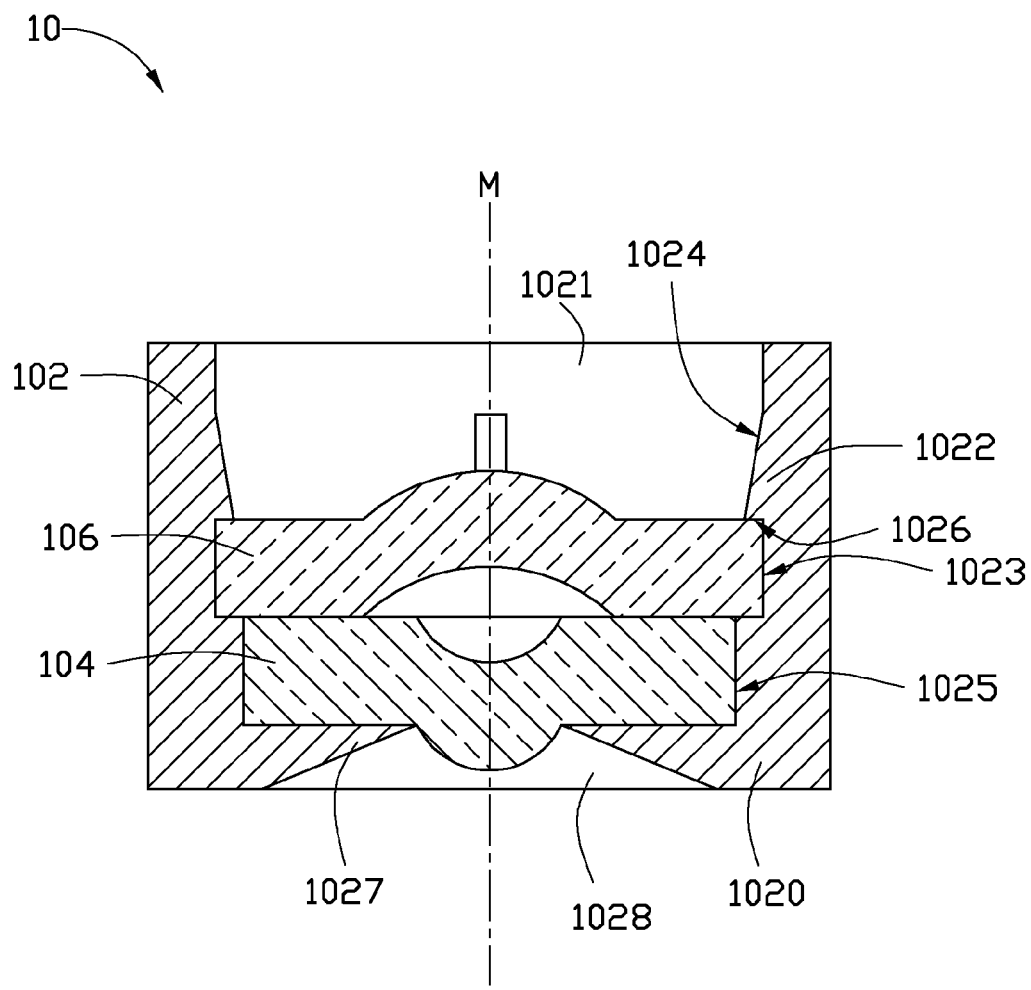
FIG. 1 is a cross-sectional view of a lens module according to a first embodiment.
Figure 2:
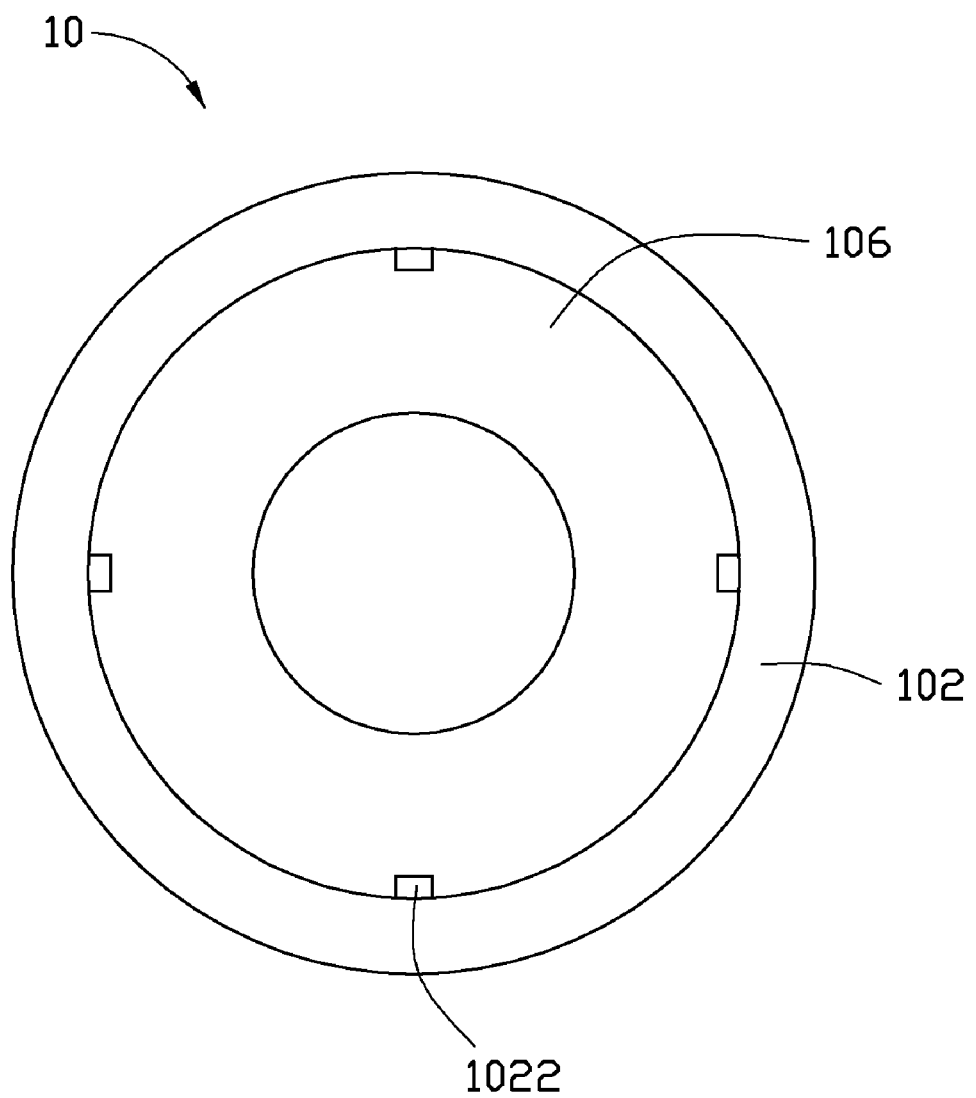
FIG. 2 is a plan top view of the lens module of FIG. 1.

Referring to FIGS. 1-2, a first embodiment of a lens module 10 includes a barrel 102, a first lens 104 and a second lens 106 received in the barrel 102.

In the present embodiment, the barrel 102 is a hollow cylinder having a first end 1020 and an opposite second end 1021. The first end 1020 extends towards a central axis M of the barrel 102 from a main body of the barrel 102 along the circumference, thus forming a supporting part 1027. The supporting part 1027 includes a light incident hole 1028 defined therein. The first lens 104 and the second lens 106 are assembled to the lens barrel 102 via the second end 1021. The barrel 102 includes at least two protrusions 1022 formed on the inner surface adjacent to the second end 1021. In the present embodiment, the barrel 102 includes four protrusions 1022. The four protrusions 1022 are evenly distributed in a circle along the inner surface of the barrel 102. The barrel 102 defines a stepped hole between the protrusions 1022 and the supporting part 1027. The stepped hole includes a first through hole 1025 and a second through hole 1023 in a direction from the first end 1020 to the second end 1021. The first through hole 1025 is for accommodating the first lens 104. The second through hole 1023 is adapted to receive the second lens 106. A inner diameter of the first through hole 1025 is less than the smallest inner diameter of a portion of the barrel 102 having the protrusions 1022. Correspondingly, an outer diameter of the first lens 104 is less than the smallest inner diameter of the portion of the barrel 102 having the protrusions 1022. Accordingly, the first lens 104 can be assembled into the barrel 102 without radially compressing the protrusions 1022. A depth of the first through hole 1025 is substantially equal to a thickness of an optically inactive portion of the first lens 104. An inner diameter of the second through hole 1023 is larger than that of the first through hole 1025. The inner diameter of the second through hole 1023 is larger than the smallest inner diameter of the portion of the barrel 102 having the protrusions 1022. Correspondingly, an outer diameter of the second lens 106 is larger than the smallest inner diameter of the portion of the barrel 102 having the protrusions 1022. In the present embodiment, a depth of the second through hole 1023 is equal to a thickness of an optically inactive part of the second lens 106.

Each of the protrusions 1022 includes a guiding surface 1024 and an engaging surface 1026. The guiding surface 1024 is for guiding the second lens 106 to the second through hole 1023 during assembly. The engaging surface 1026 is configured for contacting the optically inactive part of the second lens 106, thus fastening the first lens 104 and the second lens 106. The guiding surface 1024 extends directly from the inner surface of the barrel 102. The guiding surface 1024 is oblique relative to the central axis M of the barrel 102. An included angle between the guiding surface 1024 and the central axis M of the barrel 102 is in a range from 4 degrees to 30 degrees. A distance between the central axis M and a portion of the guiding surface 1024 adjacent to an image side is larger than that between the central axis M and a portion of the guiding surface 1024. In the present embodiment, each protrusion 1022 is substantially a right-angled triangle in cross-section. A width of each protrusion 1022 along a radial direction of the barrel 102 is less than or equal to a difference between a radius of the first through hole 1025 and the second through hole 1023. An included angle between the engaging surface 1026 and the central axis M is in a range from 60 degrees to 90 degrees. In the present embodiment, the central axis is substantially perpendicular to the engaging surface 1026. In the present embodiment, the barrel 102 is made of plastic.

The bottom surface of the optically inactive part of the first lens 104 is in contact with the supporting part 1027. The bottom surface of the optically inactive part of the second lens 106 is in contact with the top surface of the optically inactive part of the first lens 104. The engaging surface 1026 of each protrusion 1022 contacts the top surface of the optically inactive part of the second lens 106. Accordingly, the first lens 104 and the second lens 106 are securely sandwiched between the supporting part 1027 and the protrusions 1022.

In assembly, the first lens 104 is first assembled into the barrel 102, and then the second lens 106 is assembled into the barrel 102. During the assembly of the second lens 106, the second lens 106 compresses the protrusions 1022 so that the barrel 102 elastically flexes until the second lens 106 is assembled to a position between the first lens 104 and the engaging surfaces 1026 of the protrusions. Finally, the barrel 102 restores to its original size.

Figure 3:
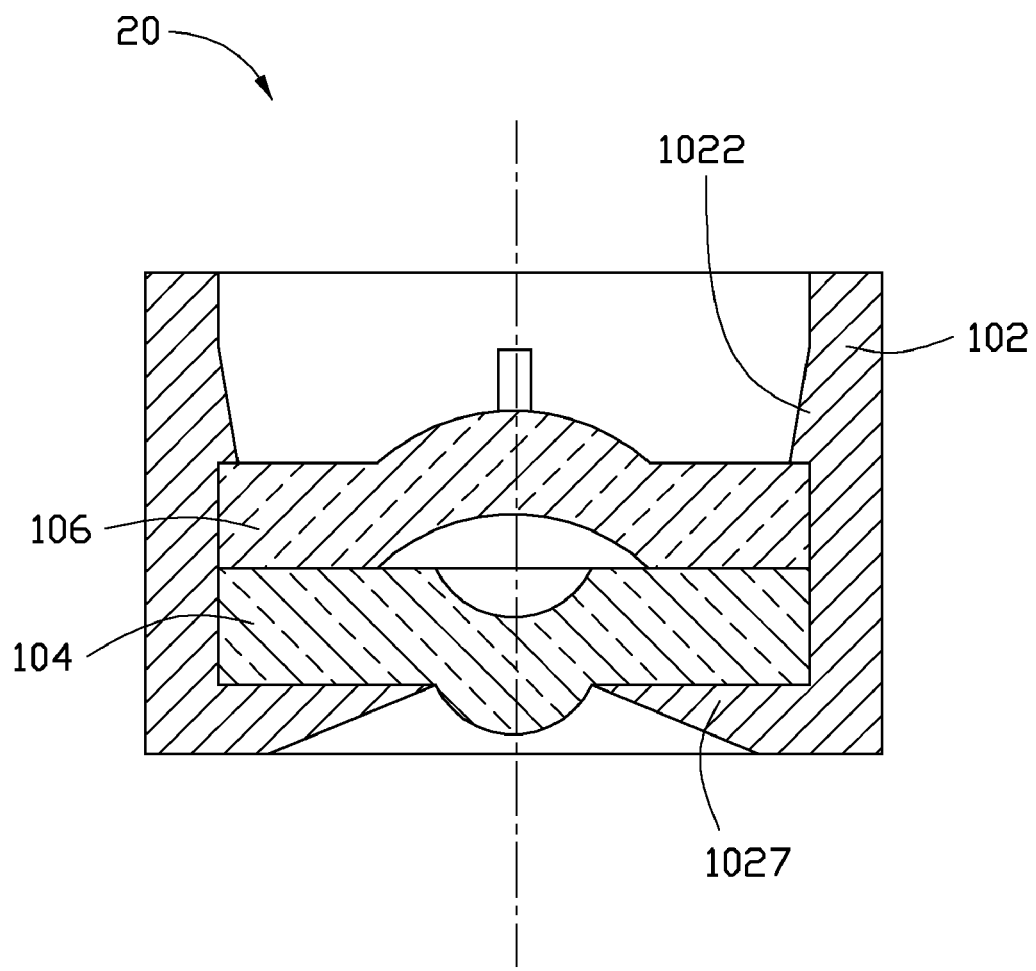
FIG. 3 is a cross-sectional view of a lens module according to a second embodiment.

Referring to FIG. 3, a lens module 20 according to a second embodiment is shown. The lens module 20 is similar to the lens module 10 except that the barrel 102 includes a cylindrical hole between the supporting part 1027 and the protrusions 1022, and the first lens 104 and the second lens 106 have the same outer diameter. An inner diameter of the cylindrical hole is less than the smallest inner diameter of a portion of the barrel 102 having the protrusions 1022.

While various embodiments have been described, it is to be understood that the disclosure is not limited thereto. To the contrary, various modifications and similar arrangements (as would be apparent to those skilled in the art), are also intended to be covered. Therefore, the scope of the appended claims should be accorded the broadest interpretation so as to encompass all such modifications and similar arrangements.

What is claimed is:

1. A barrel comprising:
   a supporting part at one end of the barrel adjacent to an image side; and
   a plurality of protrusions positioned at an inner surface of the barrel and protruding toward a central axis of the barrel, each protrusion comprising a guiding surface and an engaging surface connected with and next to the guiding surface, each guiding surface being oblique relative to the central axis, a distance between the central axis and a portion of the guiding surface adjacent to the image side being larger than that between the central axis and another portion of the guiding surface next to an object side, the guiding surface configured for guiding one or more optical components into the barrel, the engaging surface and the supporting part cooperatively clamping the optical components in the barrel.

2. The barrel of claim 1, wherein the barrel defines a stepped hole in the inner surface between the protrusions and the supporting part, the stepped hole comprises a first through hole and a second through hole in a direction from the object side to the image side, an inner diameter of the first through hole is less than the smallest inner diameter of a portion of the barrel having the protrusions, and an inner diameter of the second through hole is larger than the smallest inner diameter of a portion of the barrel having the protrusions.

3. The barrel of claim 1, wherein the barrel defines a cylindrical hole in the inner surface between the protrusions and the supporting part, and an inner diameter of the cylindrical hole is less than the smallest inner diameter of a portion of the barrel having the protrusions.

4. The barrel of claim 1, wherein an included angle between each guiding surface and the central axis is in a range from 4 degrees to 30 degrees.

5. The barrel of claim 1, wherein each guiding surface extends directly from the inner surface of the barrel.

6. The barrel of claim 1, wherein an included angle between the engaging surface and the central axis is in a range from 60 degrees to 90 degrees.

7. A lens module comprising:
a barrel; and
optical components received in the barrel;
the barrel comprising:
   a supporting part at one end of the barrel adjacent to an image side; and
   a plurality of protrusions positioned at an inner surface of the barrel and protruding toward a central axis of the barrel, each protrusion comprising a guiding surface and an engaging surface connected with and next to the guiding surface, each guiding surface being oblique relative to the central axis, a distance between the central axis and a portion of the guiding surface adjacent to the image side being larger than that between the central axis and another portion of the guiding surface next to an object side, the guiding surface configured for guiding one or more optical components into the barrel, the engaging surface and the supporting part cooperatively clamping the optical components in the barrel.

8. The lens module of claim 7, wherein the barrel defines a stepped hole in the inner surface between the protrusions and the supporting part, the stepped hole comprises a first through hole and a second through hole in a direction from the object side to the image side, an inner diameter of the first through hole is less than the smallest inner diameter of a portion of the barrel having the protrusions, and an inner diameter of the second through hole is larger than the smallest inner diameter of a portion of the barrel having the protrusions.

9. The lens module of claim 8, wherein the optical components comprise a first lens and a second lens from the object side to the image side, the first lens and the second lens are accommodated in the first through hole and the second through hole respectively, and an outer diameter of the second lens is substantially equal to the inner diameter of the second through hole.

10. The lens module of claim 9, wherein a depth of the first through hole is substantially equal to a thickness of an optically inactive part of the first lens, and a depth of the second through hole is substantially equal to a thickness of an optically inactive part of the second lens.

11. The lens module of claim 7, wherein the barrel defines a cylindrical hole in the inner surface between the protrusions and the supporting part, and an inner diameter of the cylindrical hole is less than the smallest inner diameter of a portion of the barrel having the protrusions.

12. The lens module of claim 7, wherein an included angle between each guiding surface and the central axis is in a range from 4 degrees to 30 degrees.

13. The lens module of claim 7, wherein each guiding surface extends directly from the inner surface of the barrel.

14. The lens module of claim 7, wherein an included angle between the engaging surface and the central axis is in a range from 60 degrees to 90 degrees.

15. A barrel comprising:
a supporting part at one end of the barrel adjacent to an image side;
a plurality of protrusions positioned on an inner surface of the barrel, each protrusion comprising a guiding surface and an engaging surface connected with the guiding surface, each guiding surface being oblique relative to a central axis of the barrel, a distance between the central axis and a portion of the guiding surface adjacent to the image side being larger than that between the central axis and another portion of the guiding surface next to an object side, the engaging surface and the supporting part cooperatively clamping optical components in the barrel; and
a stepped hole located in the inner surface between the protrusions and the supporting part, the stepped hole comprising a first through hole and a second through hole in a direction from the object side to the image side, an inner diameter of the first through hole being less than the smallest inner diameter of a portion of the barrel having the protrusions, and an inner diameter of the second through hole being larger than the smallest inner diameter of a portion of the barrel having the protrusions.

16. The barrel of claim 15, wherein each guiding surface extends directly from the inner surface of the barrel.

17. The barrel of claim 15, wherein an included angle between each guiding surface and the central axis is in a range from 4 degrees to 30 degrees.

18. The barrel of claim 17, wherein an included angle between the engaging surface and the central axis is in a range from 60 degrees to 90 degrees.

* * * * *